Figure 2B:
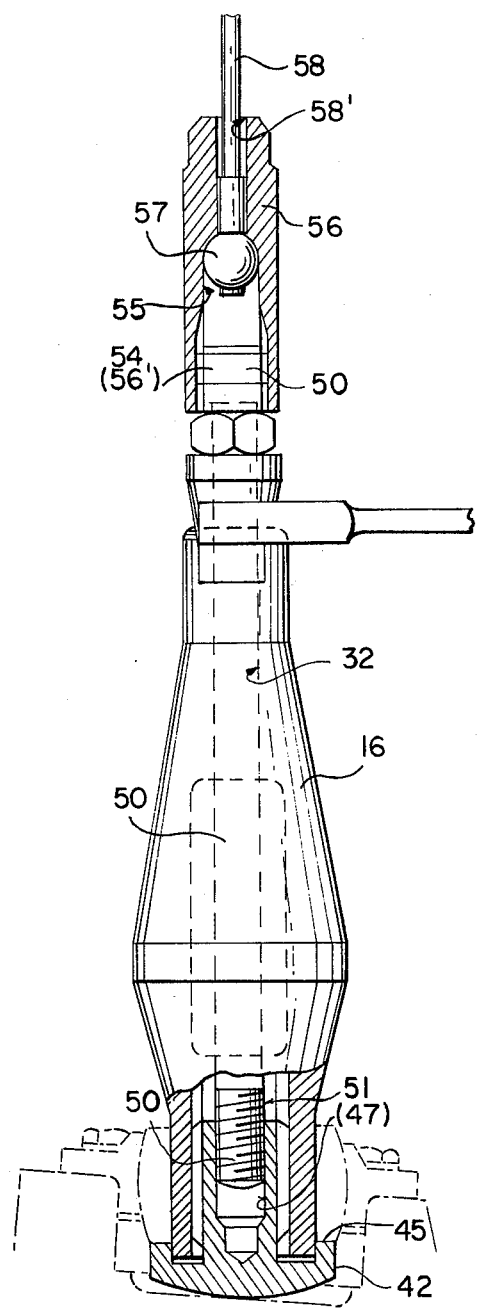

United States Patent [19]

Mahler et al.

[11] 4,079,981

[45] Mar. 21, 1978

[54] ENGINE SUSPENSION ON AIRCRAFT

[75] Inventors: Edmund Mahler, Markdorf; Wolfgang Steinkühler, Meersburg, both of Germany; René Imbert, Toulouse, France

[73] Assignees: Dornier GmbH; Avions Marcel Dassault Breguet Aviation, both of Germany

[21] Appl. No.: 714,671

[22] Filed: Aug. 16, 1976

[30] Foreign Application Priority Data

Oct. 3, 1975 Germany .............................. 2544272

[51] Int. Cl.² ............................................. B66C 1/42
[52] U.S. Cl. ................................. 294/81 R; 294/78 A
[58] Field of Search ................. 294/78 A, 78 R, 81 R, 294/86 LS; 244/54 V; 248/5

[56] References Cited

U.S. PATENT DOCUMENTS 2,349,717  5/1944  Graham .............................. 294/78 A
2,703,252  3/1955  Blackwell ........................... 294/81 R Primary Examiner—James B. Marbert
Attorney, Agent, or Firm—James E. Bryan

[57] ABSTRACT

This invention relates to an improvement in an engine suspension for aircraft having at least one bearing with a vertical thrust bolt which introduces into the aircraft cell shearing or tangential forces acting transversely to the longitudinal axis thereof, and a hoisting device for the engine assembly, the improvement comprising bearing means between the engine and the aircraft cell which bearing means permits vertical movement, anchoring means adapted to be attached to the engine, and detachable coupling means adapted to be connected between said anchoring means and said hoisting device, whereby a rigid connection for supporting said engine is produced.

5 Claims, 3 Drawing Figures

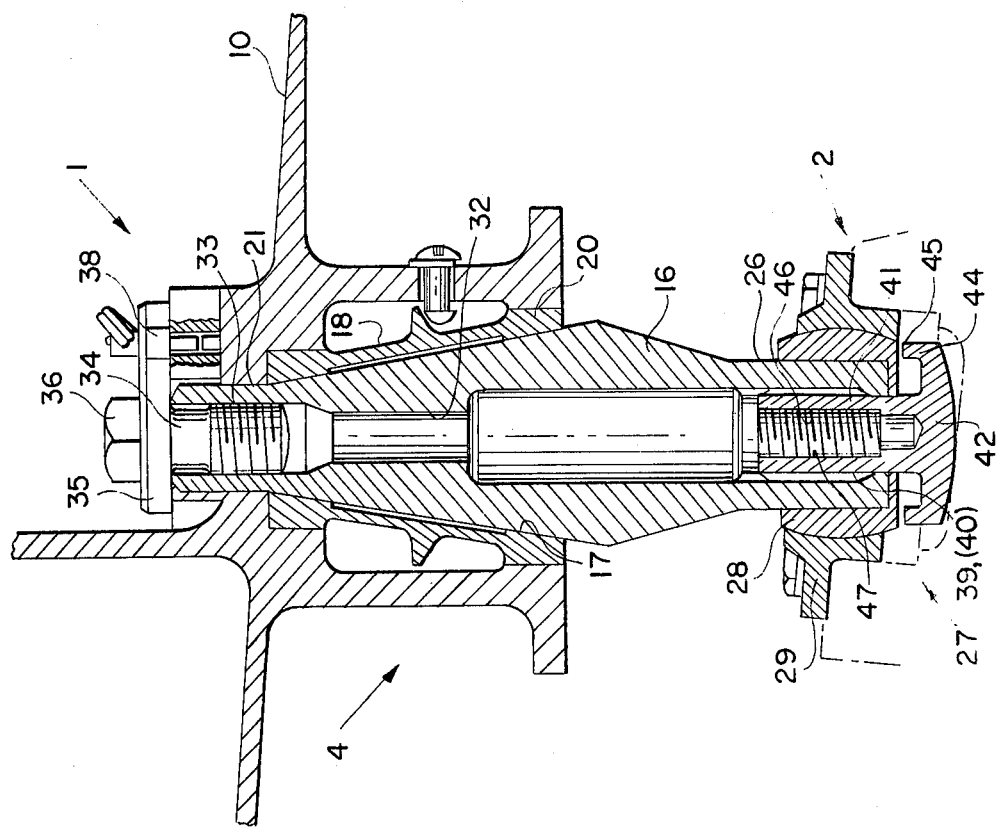
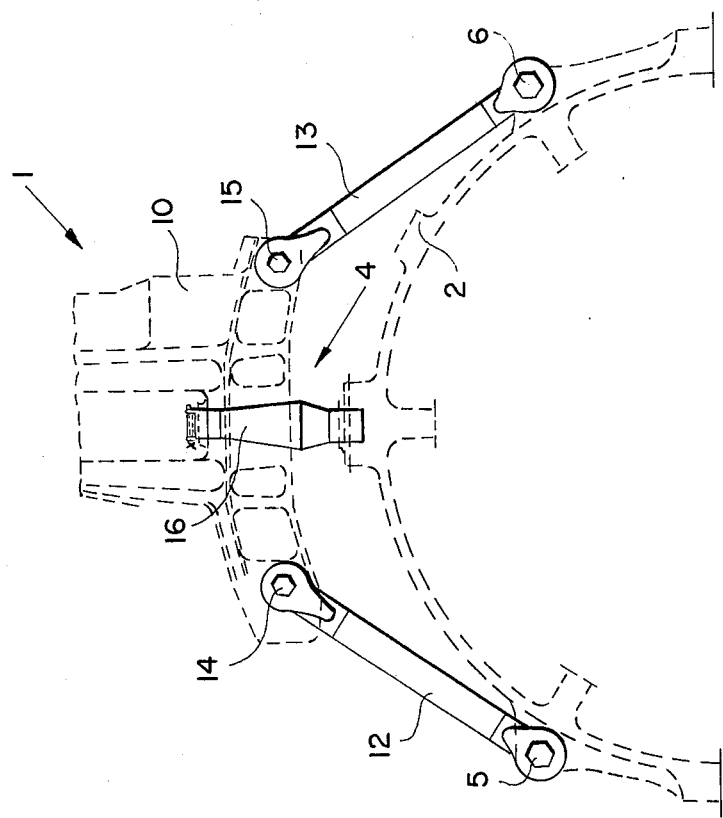

ENGINE SUSPENSION ON AIRCRAFT

The present invention relates to an engine suspension on aircraft with one or several bearings whose vertically-disposed thrust bolt introduces into the aircraft cell the shearing forces of the engine acting transversely to the longitudinal axis thereof, in conjunction with a hoisting device for the engine assembly.

Provided in engine suspensions of the aforementioned type known to date are forward and rear bearings, and these bearings have, on both sides of the vertical longitudinal central plane through the engine, a lateral bearing, and in the longitudinal central plane a further bearing. This central bearing allows for displacing movements between the engine and the aircraft cell in the vertical direction, i.e. in the direction of the longitudinal central plane. This play of movement is necessary in order that stresses between the engine and the aircraft cell, caused by thermal expansion or vibrations, be avoided. Since, due to the thrust bolt, there is no rigid connection in the vertical direction between the aircraft cell and the engine, specific means are needed during the assembly and disassembly of the engine, at the aircraft cell after loosening of the lateral bearings for receiving the engine. Such means, however, require additional space; they contribute additional weight, and are undesirable in their handling.

It is the object of the present invention to provide an engine suspension which is considerably simpler and lighter as compared to the known art, and which renders possible a considerably simpler handling.

This object is obtained in accordance with the present invention, in that positioned between the engine and the aircraft cell is a bearing allowing for vertical movements, in that positioned at the engine are members adapted to be optionally connected thereto, and in that, by means of a detachable coupling between the members and the hoisting device, a rigid connection for carrying the engine may be produced. The effect actually achieved with such a construction is that the bearing between the engine and the aircraft cell constitutes at the same time a part of the hoisting device while the required vertical possibility of movement between the engine and the aircraft cell in the assembled or mounted condition of the engine is not impaired.

According to a further embodiment of the present invention, the thrust bolt rigid at the aircraft cell is made hollow for the extension therethrough of a part of the hoisting device, and this part is adapted to be coupled to an anchoring part or element adapted to be attached to the engine. The anchoring part or element allows, in the assembled condition of the engine, for free movement between the engine and the aircraft cell in the vertical direction.

It is further provided by the present invention that the engine, by means of a pivot bearing, is movably guided at the thrust bolt in the direction of the longitudinal axis thereof, and in the vertical direction. Thus made possible for the engine, in addition to the freedom of movement between the engine and the aircraft cell in the vertical direction, is also a pendulum movement. The possibility of free movement is in no way impaired by the anchoring part or element of the hoisting device receiving the engine. Only the coupling between the anchoring part or element and the hoisting device annuls the possibility of movement in the vertical direction between the engine and the thrust bolt. After loosening of the lateral bearings and after connection of the anchoring part or element with the hoisting device, the engine is carried via the anchoring part or element and may be removed from the aircraft cell or received thereat. Since the thrust bolt represents on the one hand the centering of the engine at the aircraft cell and at the same time also a part of the hoisting device, the assembly of the engine at the aircraft cell is considerably simplified.

One embodiment of the present invention is illustrated in the accompanying drawings, wherein FIG. 1 illustrates, in a schematized view, a part of the aircraft cell in conjunction with the engine in a front view thereof and partially in cross-section;

FIG. 2a illustrates the central forward bearing of the engine suspension in the position as a loose bearing, at an enlarged scale as compared to FIG. 1, and FIG. 2b illustrates the position of the bearing as a rigid bearing, as compared to FIG. 2a.

It is the prerequisite for the construction shown that the thrust bolt be positioned vertically and engage in the longitudinal central plane of the engine.

In FIG. 1, reference numeral 1 identifies the aircraft cell and reference numeral 2 identifies the engine received at the cell. The engine has been marked therein in phantom. The engine 2 is suspended at the aircraft cell 1 by way of a rear bearing, and by way of a central forward bearing 4 as well as two lateral forward bearings 5 and 6 at the aircraft cell 1(FIG. 1). For the forward bearings 4, 5, and 6, the aircraft cell 1 has a fitting or mounting 10. The suspension of the engine 2 in the forward area is effected by way of lateral connecting rods 12 and 13 which are hingedly connected on the one hand at the lateral bearings 5 and 6 of the engine 2 and on the other hand at the lateral bearings 14 and 15 of the aircraft cell 1 at the bearing fitting 10 thereof.

As is apparent from FIG. 2a in detail, the central forward bearing 4 for the suspension of the engine 2 is composed of a thrust bolt 16 which is inserted into a recess 17 at the aircraft cell 1 or the fitting 10. The thrust bolt transmits in this case not only the shearing forces of the engine 2 to the aircraft cell 1, but also serves simultaneously as a centering means for receiving the engine 2 during assembly. For insertion into the cell 1 the thrust bolt 16 is conical on a section 18 of its axial extension and centers itself in the corresponding conical recess 17 when the engine 2 is inserted into the aircraft cell 1. Inserted between the thrust bolt 16 and the aircraft cell 1 is a conical bearing bushing 20. The thrust bolt 16 includes a cylindrical section 21 at its upper end. At the lower end, the thrust bolt 16 has a cylindrical projection 26 on which a bearing inner ring 28 of a pivot bearing 27 positioned at the engine 2 is axially displaceably guided. Rigidly connected with the engine 2 is the bearing outer ring 29 which appertains to the bearing 27. The thrust bolt 16 has a continuous longitudinal bore 32 into which, in the upper portion thereof, a thread 33 is cut. Adapted to be threaded into this thread 33 is a bolt 34 which comprises a flange 35 and a hexagonal head 36. When the bolt 34 is screwed in, the thrust bolt 16 is pulled with its conical section 18 against the conical recess 17 of the bearing bushing 20, and thereby secured to the aircraft cell 1 and centered. Inserted between the collar 35, the bolt 34, and the aircraft cell 1 is a safety or locking screw 38 of known construction which prevents an unintentional detachment of the thrust bolt 16.

Machined into the longitudinal bore 32 at the lower end of the thrust bolt 16 is a spline 39. Into this spline 39 engages a counter spline 40 which is machined into the collar 41 of an anchoring part 42. By means of these splines 39 and 40, the anchoring part 42 may freely move in the direction of the longitudinal axis of the thrust bolt 16. In the direction of rotation, on the other hand, a rigid connection is established between the anchoring part 42 and the thrust bolt 16. The anchoring part 42 comprises at its collar 41 a potshaped projection 44 which can come to be positioned with its lateral face 45 against the bearing inner ring 28 connected with the engine 2. In the assembled condition of the engine 2, there is no connection between the thrust bolt 16 and the anchoring part 42 in the vertical direction, as has already been described herein, so that the engine 2 can freely move by way of the bearing 27 with respect to the aircraft cell 1. Machined into the collar 41 of the anchoring part 42 is a longitudinal bore 46 with an internal thread 47 into which thread a part of the hoisting device may be threaded for assembly or disassembly of the engine 2, as will be more fully described hereinbelow.

As is apparent from FIG. 2b, a rod 50 of the hoisting device may be inserted, after unscrewing the bolt 34, into the longitudinal bore 32 of the thrust bolt 16, which rod 50 includes at its lower end an external thread 51. With this thread 51, the rod 50 is adapted to be threaded into the internal thread 47 of the anchoring part 42 below the pivot bearing 27. At its upper end, the rod 50 also has a thread 54 upon which a screw cap 56 may be threaded with its internal thread 56'. The screw cap 56 has on the inside thereof a ball cup or socket 55 into which a ball 57 may be inserted which forms the end of a hoisting wire 58. The hoisting wire 58 extends upwardly out of the screw cap 56 by way of a bore 58' and is in operative connection with a winch for the hoisting device, which is not further illustrated herein.

The operation of the construction as described herein is such that, according to FIG. 2a of the drawings, the thrust bolt 16 - by means of the tightened bolt 34 with the intermediary action of the conical bushings 20 - is firmly pulled with its conical part 18 against the conical surface of the recess 17 in the fitting 10 of the aircraft cell 1 and is thereby centered at the latter at the same time. In this condition while mounted at the aircraft cell 1, the anchoring part 42 positioned below the bearing inner ring 28 is not in contact with the bearing ring 28, but rather there exists an axial distance between the anchoring part 42 and the bearing inner ring 28. Due to this distance, a movement between the engine 2 and the aircraft cell 1 is rendered possible. The thrust bolt 16 is thus to be considered as a part of the aircraft cell 1, and the pivot bearing 27 as a part of the engine 2. The anchoring part 42 appertains with rod 50 and the hoisting wire 58 (FIG. 2b) to the hoisting device which serves for the assembly and disassembly of the engine 2 at the aircraft cell 1.

As has already been set forth herein, FIG. 2b shows the operation of the hoisting device. For purposes of the conversion of the bearing 28, 29 being movable in the direction of the longitudinal axis of the thrust bolt 16 into a rigid bearing, in other words, into a bearing which allows for a movement between the engine 2 and the aircraft cell 1 in the vertical direction, the bolt 34 is removed, and introduced in its place into the longitudinal bore 32 of the thrust bolt 16 is the rod 50. The rod 50 is threaded with its thread 51 into the internal thread 47 of the anchoring part 42. Thereby the anchoring part 42 which, via the splines 39 and 40, is non-rotatably connected with the thrust bolt 16 is moved in the axial direction, and there will be brought about the positioning of the marginal surface or lateral face 45 of the anchoring part 42 against the lower end face of the bearing inner ring 28 of the pivot bearing 27. The engine 2 can in this case continue to execute, via the pivot bearing 27, a pivoting movement with respect to the longitudinal axis of the thrust bolt 16 so that the engine 2 may be inclined with regard to its longitudinal axis. With the aid of the winch, not illustrated herein, the engine 2 now may be lowered onto an assembly cart, for example during the disassembly thereof, by means of the hoisting wire 58, the rod 50, and the anchoring part 42.

It will be obvious to those skilled in the art that many modifications may be made within the scope of the present invention without departing from the spirit thereof, and the invention includes all such modifications.

What is claimed is:

1. In an engine suspension for aircraft having at least one bearing with a vertical thrust bolt which introduces into the aircraft cell shearing or tangential forces acting transversely to the longitudinal axis thereof, and a hoisting device for the engine assembly, the improvement comprising bearing means between the engine and the aircraft cell which bearing means permits vertical movement, anchoring means adapted to be attached to the engine, and detachable coupling means adapted to be connected between said anchoring means and said hoisting device, whereby a rigid connection for supporting said engine is produced.

2. A suspension according to claim 1 in which a portion of said hoisting device extends through said thrust bolt and is connected to said anchoring means.

3. A suspension according to claim 1 including pivot bearing means at said thrust bolt, whereby said engine is movably guided in the direction of the longitudinal axis thereof and in the vertical direction.

4. A suspension according to claim 3 including circular means on said anchoring means adapted to engage said pivot bearing means mounted at said thrust bolt.

5. A suspension according to claim 1 including means whereby said anchoring means is freely movably but non-rotatably guided at the thrust bolt in the direction of the longitudinal axis thereof, and thread means between said hoisting device and said anchoring means, whereby said anchoring means may be vertically displaced.

* * * * *